Sept. 9, 1924.
J. B. JOHNSON
1,507,919
APPARATUS AND METHOD FOR ADMITTING GAS INTO A VACUUM
Filed Dec. 15, 1922
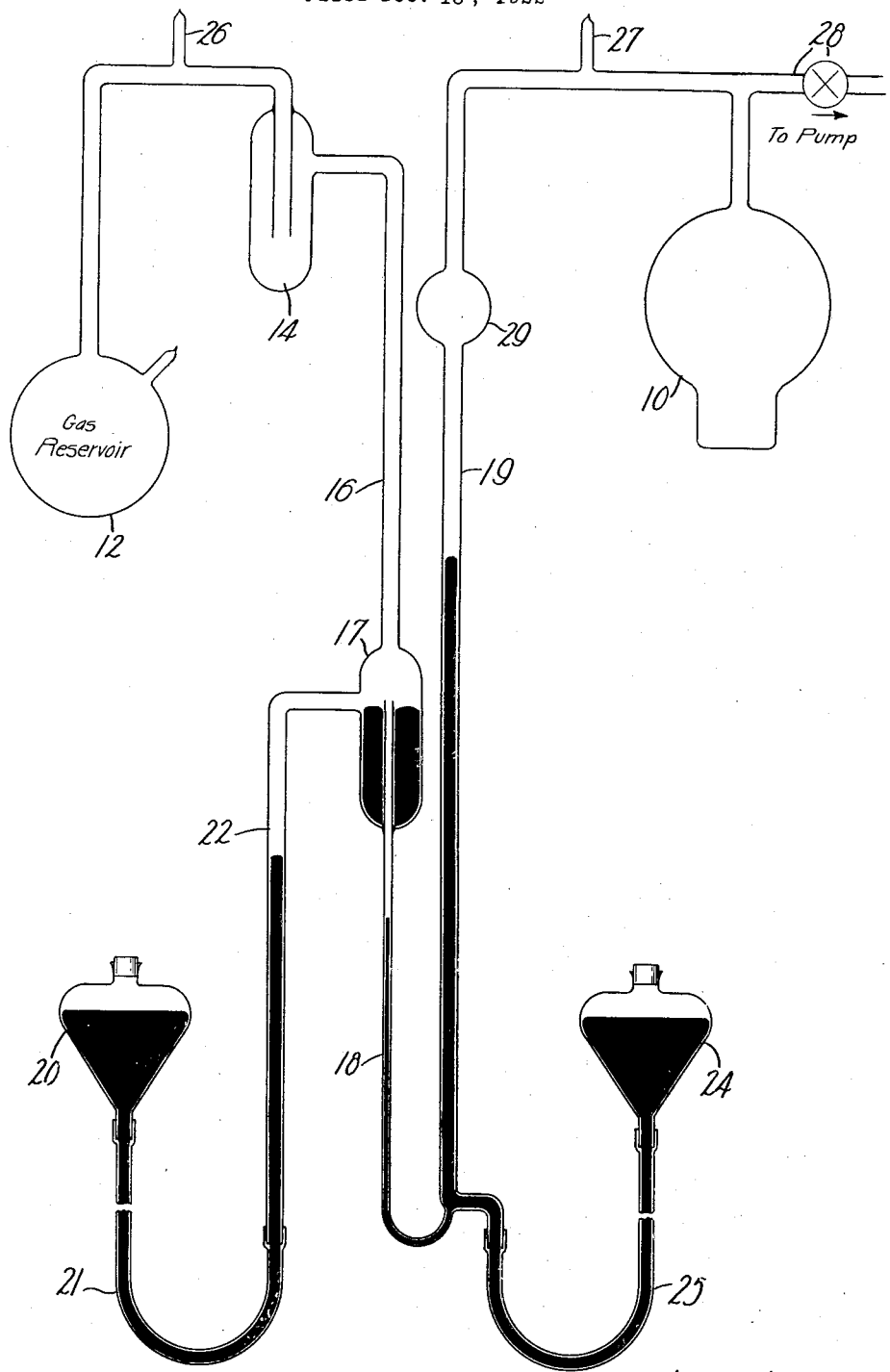
Inventor:
John B. Johnson,
by Joel C. R. Palmer, Atty.

Patented Sept. 9, 1924.

1,507,919

UNITED STATES PATENT OFFICE.

JOHN B. JOHNSON, OF ELMHURST, NEW YORK, ASSIGNOR TO WESTERN ELECTRIC COMPANY, INCORPORATED, OF NEW YORK, N. Y., A CORPORATION OF NEW YORK.

APPARATUS AND METHOD FOR ADMITTING GAS INTO A VACUUM.

Application filed December 15, 1922. Serial No. 607,187.

*To all whom it may concern:*

Be it known that I, JOHN B. JOHNSON, a citizen of the United States, residing at Elmhurst, in the county of Queens, State of New York, have invented certain new and useful Improvements in Apparatus and Methods for Admitting Gas into a Vacuum, of which the following is a full, clear, concise, and exact description.

This invention relates to apparatus and methods for admitting gas into a vacuum and has for an object to admit measured quantities of gas into an evacuated system without appreciably reducing the purity of the gas.

In accordance with the invention, connection is made from a gas reservoir to the evacuated apparatus through passages which at all times contain a seal of a liquid such as mercury for separating the two parts of the apparatus. A portion of the connection is in the form of a capillary tube in which by adjusting the height of a mercury column a quantity of gas can be measured off and sealed at both ends with a body of mercury. The quantity of gas thus trapped is then advanced by movements of the mercury columns and discharged into the evacuated apparatus.

The invention will be more fully understood from the following detailed description and claims taken in connection with the accompanying drawing which illustrates in schematic form one embodiment of the invention.

Referring to the drawing by reference numerals, an evacuated system is represented at 10. This may be an evacuated tube of any type which contains gas during operation or may represent any evacuated system either during the process of evacuation or after evacuation. The gas container 12 may be of the type now used for marketing rare gases, such as argon, helium, etc. in which a weight is provided for breaking a glass seal after the container has been connected to apparatus into which the gas is to be discharged. Connection is made from container 12 to apparatus 10 through a trap 14 for collecting any particles of glass which may be carried off when the seal is broken, a passage 16 terminating in a chamber 17, a capillary tube 18 having its upper end extending into chamber 17 and a passage 19. A mercury reservoir 20 is connected by flexible tube 21 and passage 22 to the chamber 17. The opening into chamber 17 is slightly below the upper end of the capillary tube. A mercury reservoir 24 is connected by a flexible tube 25 to the lower end of passage 19.

When a reservoir 12 containing gas has been connected to the system, but before its seal is broken, the system is thoroughly evacuated. The portion of the system at the left of the figure may be connected to the portion at the right by glass tubing sealed on at 26 and 27. A suitable vacuum pump may be connected at 28. The tubing of the system is so mounted that it may be heated by a Bunsen flame during evacuation. The cross connection is then sealed off at 26 and 27 and the gas from chamber 12 permitted to flow into passage 16. The connection 28 is usually sealed off or otherwise closed before gas is admitted into apparatus 10.

In operation reservoir 24 is raised until the column of mercury in capillary tube 18 measures off from the upper end of the tube the desired quantity of gas. For this purpose tube 18 is preferably calibrated in suitable units of length or volume. Reservoir 20 is then raised and the mercury flows from this reservoir closing the upper end of tube 18. Reservoir 20 is then further raised and the body of gas trapped in tube 18 is forced downwardly and into passage 19. Passage 19 is of sufficiently large diameter that the gas bubbles up through the mercury and is discharged into apparatus 10. Passage 19 is enlarged to form chamber 29 for the purpose of insuring that none of the mercury is carried out of passage 19 with the gas.

This operation may be repeated as often as desired, it being understood that when the supply of mercury in reservoir 20 becomes too small, reservoir 24 can be raised high enough to pour some of its contents back into reservoir 20.

The total height of the apparatus is somewhat greater than twice the height of the barometric mercury column at atmospheric pressure, so that with ordinary care there is no danger of losing the gas or of letting air into it when the pressure on the evacuated side of the system is changed. The body of gas in container 12 may be kept indefinitely without danger of contamination. A further advantage of the system lies in the fact that no glass valves are employed.

While only one embodiment of the invention has been shown, it is to be understood that the invention may assume other forms within the scope of the appended claims.

The invention claimed is:

1. The method of conveying gas which comprises admitting gas into one end of a capillary tube, adjusting the length of the column of gas thus admitted, isolating said column of gas and discharging said column of gas from the opposite end of said tube.

2. Gas conveying apparatus comprising a capillary tube, means for connecting its upper end with a source of gas, means for raising a column of mercury in said tube, and means for trapping a column of gas above said liquid column and for discharging said trapped gas from the lower end of said tube.

3. Gas conveying apparatus comprising two substantially vertical passages communicating at their lower ends, the lower portion of one of said passages being in the form of a capillary tube, means for introducing and withdrawing a liquid at the lower end of said passages, and means for introducing and withdrawing a liquid at the upper end of said capillary tube.

4. Gas conveying apparatus comprising two upright passages communicating at their lower ends, the lower portion of one of said passages being in the form of a capillary tube, two movable reservoirs of liquid, one of said reservoirs being flexibly connected to the lower ends of said passages and the other of said reservoirs being flexibly connected to the upper end of said capillary tube.

5. Gas conveying apparatus comprising two upright passages communicating at their lower ends, the lower portion of one of said passages being in the form of a capillary tube, a passage extending from a level adjacent to the lower ends of said first passages and communicating with the upper end of said capillary tube and two liquid reservoirs, said reservoirs being flexibly connected respectively to the lower ends of said first two passages and the lower end of said third passage.

6. Means for admitting gas into evacuated apparatus comprising a capillary tube, connections from the upper end of said capillary tube to a source of gas and to a source of liquid, connections from the lower end of said capillary tube to the evacuated apparatus and to a second source of liquid, means for adjusting the height of liquid from said second source in said capillary tube whereby a measured column of gas is permitted to enter said tube, means for admitting liquid from said first source to close the upper end of said tube and for advancing said measured column of gas through said capillary tube and into said passage extending to said evacuated apparatus.

7. The method of conveying gas which comprises admitting into a capillary tube a column of gas of a desired length, isolating said column of gas, and thereafter discharging said column of gas from said tube.

In witness whereof, I hereunto subscribe my name this 7th day of December, A. D. 1922.

JOHN B. JOHNSON.